United States Patent
Nagura (10) Patent No.: US 9,366,587 B2
(45) Date of Patent: Jun. 14, 2016

(54) OPTICAL FORCE SENSOR AND APPARATUS USING OPTICAL FORCE SENSOR

(71) Applicant: CANON KABUSHIKI KAISHA, Tokyo (JP)

(72) Inventor: Chihiro Nagura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/670,645

(22) Filed: Mar. 27, 2015

(65) Prior Publication Data

US 2015/0276518 A1    Oct. 1, 2015

(30) Foreign Application Priority Data

Apr. 1, 2014 (JP) ................. 2014-075058

(51) Int. Cl.

| | | |
|---|---|---|
| G01B 11/14 | (2006.01) | |
| G01L 1/24 | (2006.01) | |
| G01B 9/02 | (2006.01) | |
| G01L 7/08 | (2006.01) | |
| G01L 1/00 | (2006.01) | |
| G01B 11/16 | (2006.01) | |
| G01L 5/16 | (2006.01) | |

(52) U.S. Cl.
CPC ............ *G01L 1/242* (2013.01); *G01B 9/02028* (2013.01); *G01B 11/14* (2013.01); *G01B 11/161* (2013.01); *G01L 1/005* (2013.01); *G01L 5/16* (2013.01); *G01L 7/086* (2013.01)

(58) Field of Classification Search
CPC ........... G01L 1/242; G01L 7/086; G01L 5/16; G01B 11/005
See application file for complete search history.

(56) References Cited

U.S. PATENT DOCUMENTS

| | | | |
|---|---|---|---|
| 8,965,577 B2 | 2/2015 | Arimitsu | |
| 2010/0171704 A1* | 7/2010 | Senft | G01D 5/34 345/168 |
| 2010/0312394 A1 | 12/2010 | Arimitsu | |

FOREIGN PATENT DOCUMENTS

| | | |
|---|---|---|
| DE | 19962078 A1 | 8/2000 |
| JP | 2010-281635 A | 12/2010 |

OTHER PUBLICATIONS

Shigeo Hirose et al., "Development of Optical 6-Axial Force Sensor and its Signal Calibration Considering Non-Linear Interference", Proceedings of the International Conference on Robotics and Automation, May 13, 1990, pp. 46-53, XP000139927.

* cited by examiner

*Primary Examiner* — Tony Ko
(74) *Attorney, Agent, or Firm* — Fitzpatrick, Cella, Harper & Scinto (57) ABSTRACT

The optical force sensor includes a base member, a displaceable member, an elastic member disposed between the base and displaceable members and a displacement detector optically detecting a displacement of the displaceable member caused by an external force. The displacement detector causes first and second light fluxes to form interference fringes on a first light-receiving element. The first light flux from a light source is internally reflected at a gap-side surface of a light-transmissive member. The second light flux from the light source is transmitted through the light-transmissive member, reflected by a reflective surface provided to the displaceable member and again transmitted through the light-transmissive member. The displacement detector outputs, from the first light-receiving element, a signal corresponding to a variation in intensity distribution of the interference fringes.

10 Claims, 5 Drawing Sheets

OPTICAL FORCE SENSOR AND APPARATUS USING OPTICAL FORCE SENSOR

BACKGROUND OF THE INVENTION

1. Field of the Invention

The present invention relates to an optical force sensor to be used to detect an external force.

2. Description of the Related Art

As a force sensor to detect an external force, Japanese Patent Laid-Open No. 2010-281635 discloses one that quantitatively detects the external force from displacement information acquired by using an optical displacement detector that includes multiple light-receiving elements. This optical force sensor is capable of detecting displacements in multiple axes including a displacement in a nonparallel-to-surface direction with respect to light-receiving surfaces of the light-receiving elements while having a small thickness.

However, the force sensor disclosed in Japanese Patent Laid-Open No. 2010-281635 has a difficulty in providing a sufficient sensitivity to detect the displacement in the nonparallel-to-surface direction without reducing its stiffness so as to allow a large displacement in that direction. Furthermore, the disclosed force sensor is likely to be affected by a variation in light quantity of a light source.

SUMMARY OF THE INVENTION

The present invention provides an optical force sensor whose thickness can be reduced and which is capable of highly sensitively detecting, without reducing a sensor stiffness, an external force acting in a nonparallel-to-surface direction with respect to a light-receiving surface of a light-receiving element.

The present invention provides as an aspect thereto an optical force sensor including a base member, a displaceable member, the displaceable member and the base member being mutually separated in a first direction, an elastic member disposed between the base member and the displaceable member, and a displacement detector configured to optically detect a displacement of the displaceable member with respect to the base member, the displacement being caused by an external force. The displacement detector includes a light source provided to one member of the base member and the displaceable member, a reflective surface provided to another member of the base member and the displaceable member, a light-transmissive member disposed between the light source and the reflective surface and having a gap with the reflective surface, and a first light-receiving element provided to the one member. The displacement detector is configured to cause a first light flux and a second light flux to form interference fringes on the first light-receiving element, the first light flux exiting from the light source and being internally reflected at a gap-side surface of the light-transmissive member, the second light flux exiting from the light source, being transmitted through the light-transmissive member, being reflected by the reflective surface and being again transmitted through the light-transmissive member, and to output an output signal based on a variation of a first signal output from the first light-receiving element configured to detect an intensity distribution of the interference fringes, the variation being caused by a displacement of the displaceable member in the first direction.

The present invention provides as another aspect an apparatus including a movable portion configured to perform an operation, the above optical force sensor, and a controller configured to control the operation of the movable portion by using the optical force sensor.

Further features of the present invention will become apparent from the following description of exemplary embodiments with reference to the attached drawings.

DESCRIPTION OF THE EMBODIMENTS

Exemplary embodiments of the present invention will be described below with reference to the attached drawings.

Embodiment 1

Figure 1:
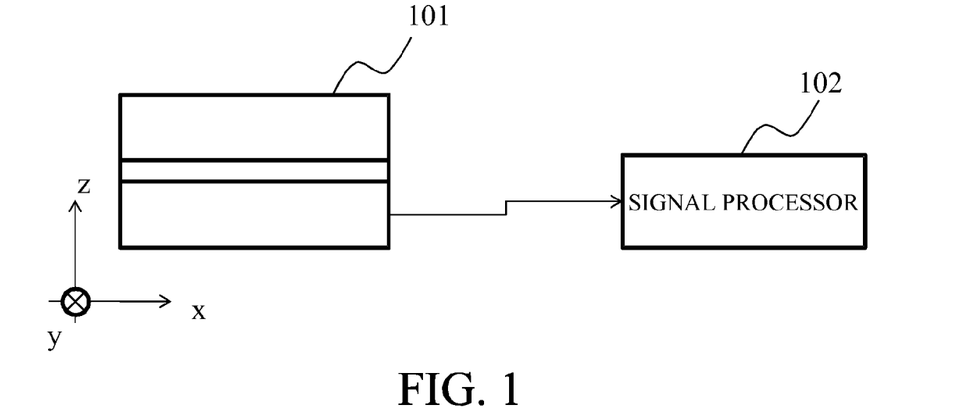
FIG. 1 illustrates a configuration of an optical force sensor that is Embodiment 1 of the present invention.

FIG. 1 illustrates a configuration of an optical force sensor that is a first embodiment (Embodiment 1) of the present invention. The force sensor is constituted by a sensor unit 101 and a signal processor 102 serving as a first calculator. The sensor unit 101 outputs, to the signal processor 102, a displacement signal indicating a displacement of a displaceable member (described later) in the sensor unit 101, the displacement being caused by an external force. The signal processor 102 calculates a vector amount of the external force from the input displacement signal and outputs a calculation result as a force signal.

Figure 2:
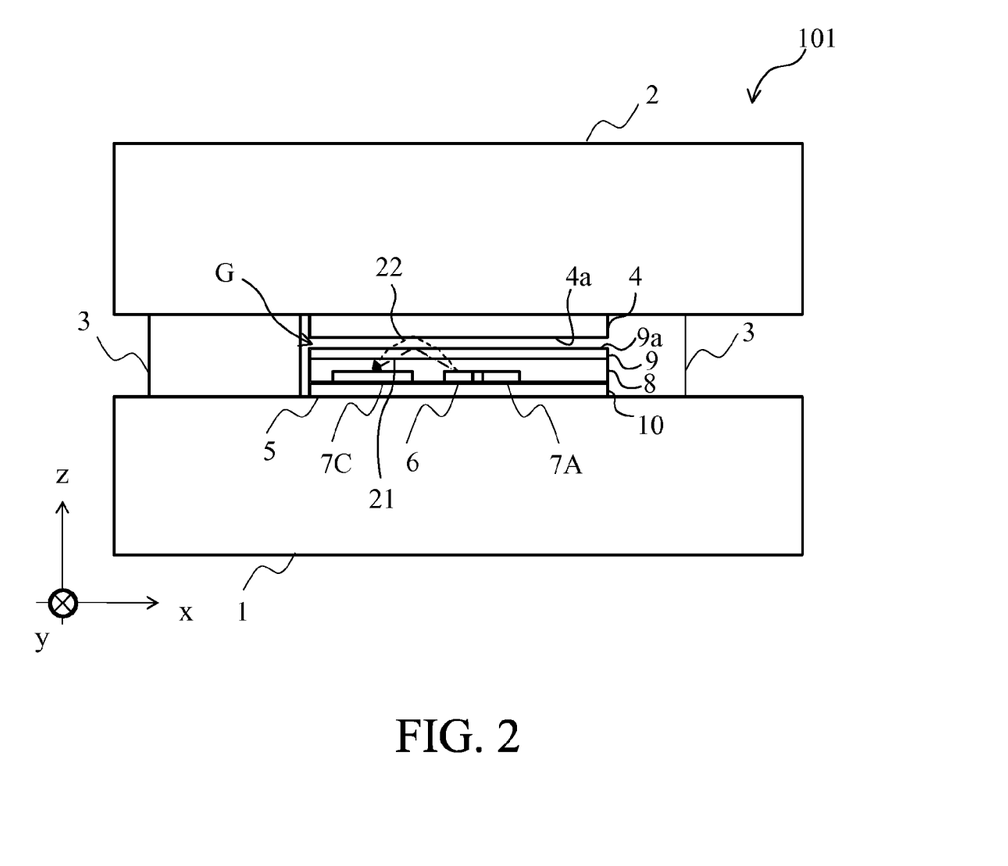
FIG. 2 is a side sectional view of a sensor unit in the force sensor of Embodiment 1.
Figure 3:
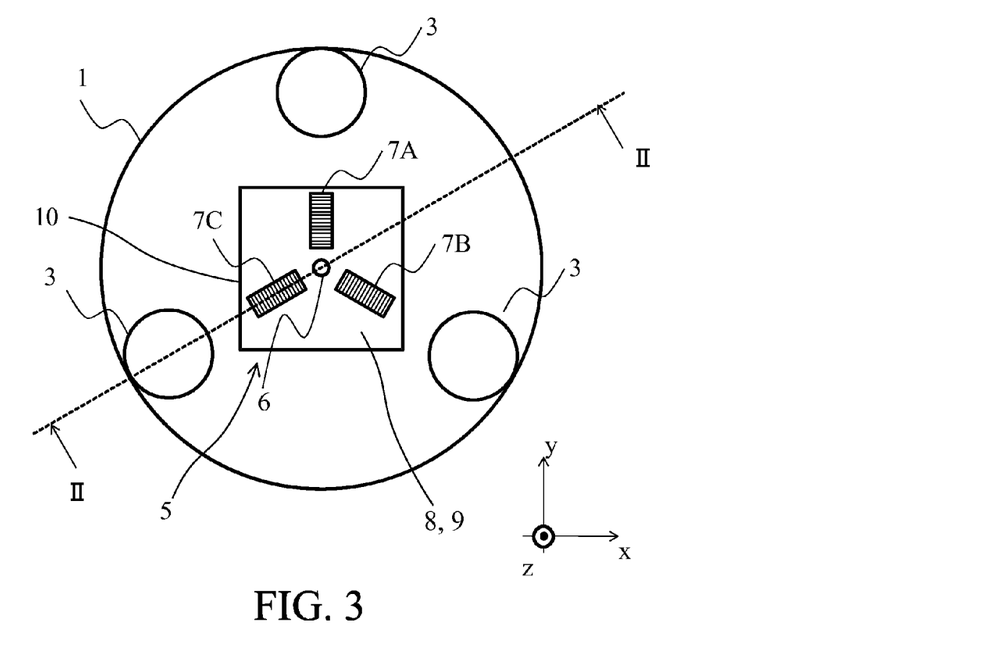
FIG. 3 is an x-y sectional (z-axis cross-sectional) view of the sensor unit of Embodiment 1.

FIG. 2 illustrates a side section of the sensor unit 101 viewed from a direction of a y-axis (hereinafter referred to as "a y-axis direction"), and FIG. 3 illustrates a z-axis cross-section of the sensor unit 101. FIG. 2 illustrates a section of the sensor unit 101 cut along a II-II line in FIG. 3.

The sensor unit 101 is constituted by a base member 1, a displaceable member 2, elastic supporting members (elastic member) 3 and a displacement detector 5 (including a detector body and a reflective member 4). FIG. 3 illustrates a configuration of the sensor unit 101 in which the displaceable member 2 and the reflective member 4 are omitted and the base member 1, the elastic supporting members 3 and the detector body of the displacement detector 5 are viewed from a direction of a z-axis (vertical direction; hereinafter referred to as "a z-axis direction"). A direction of an x-axis orthogonal to the y- and z-axis directions is hereinafter referred to as "an x-axis direction".

The base member 1 and the displaceable member 2 each having a disk shape are arranged so as to be mutually separate in the z-axis direction (first direction as a separation direction of the base and displaceable members 1 and 2) in which a z-axis that is a disk center axis thereof extends and are connected to each other via the three cylindrical-shaped elastic supporting members 3 arranged therebetween. The displaceable member 2 is vertically displaceable with respect to the base member 1 in the z-axis direction according to an external force acting on the displaceable member 2 while elastically deforming the elastic supporting members 3. In addition, the displaceable member 2 is parallel displaceable with respect to the base member 1 in directions (second direction) along the x- and y-axes orthogonal to the z-axis and is rotationally displaceable with respect to the base member 1 in directions about the x-, y- and z-axes.

An elasticity of each elastic supporting member 3 only has to be appropriately set for a magnitude range of the external force to be detected and for a stiffness required for the sensor unit 101. Specifically, when the sensor unit 101 is to detect a minute external force, the elasticity of each elastic supporting member 3 is set to be low so that the displaceable member 2 can be displaced even by the minute external force. On the other hand, when the sensor unit 101 is to detect a large external force or when a high mechanical stiffness of the sensor unit 101 is required, the elasticity of each elastic supporting member 3 is set to be high. The detector body of the displacement detector 5 is constituted by a light source 6, three light-receiving element arrays (first light-receiving element) 7A, 7B and 7C, a sealing layer 8 formed by a light-transmissive plastic, a cover glass 9 as a light-transmissive member and a circuit substrate 10. The circuit substrate 10 has a rectangular shape (or a circular shape) and is fixed to a central portion of a circular-shaped upper surface (plane) of the base member 1. The above-described three elastic supporting members 3 are arranged at three 120-degree angularly-spaced positions surrounding the displacement detector 5 that includes the circuit substrate 10.

At a center of the circuit substrate 10, the light source 6 is mounted. Of the circuit substrate 10, at three 120-degree angularly-spaced positions surrounding the light source 6, the three light-receiving element arrays 7A, 7B and 7C are respectively mounted so as to radially extend. The light source 6 and the light-receiving element arrays 7A, 7B and 7C are covered by the sealing layer 8 formed so as to cover an upper surface of the circuit substrate 10. Furthermore, on an upper surface of the sealing layer 8, the cover glass 9 is disposed.

Above the cover glass 9, the reflective member 4 formed by a glass plate is fixed to a lower surface of the displaceable member 2. Between an upper surface 9a that is a gap-side surface (described later) of the cover glass 9 and a lower surface (reflective surface) 4a of the reflective member 4, a gap (air layer) G having a height approximately 20 μm is formed.

As described above, the light source 6 and the light-receiving element arrays 7A, 7B and 7C mounted on the circuit substrate 10 (i.e., on a same substrate and on an x-y plane as a same plane) fixed to the base member 1 are arranged so as to face the reflective member 4 displaceable together with the displaceable member 2 across the cover glass 9 and the gap G. The light source 6 is constituted by a light-emitting element suitable as a point light source, for example, a current confinement structure LED. Since the current confinement structure LED has spatial coherence and thus can have a wider light distribution angle than that of a semiconductor laser, the LED is suitable for a case where an emitted light therefrom is received at multiple positions. The current confinement structure LED has a light distribution mostly approximated by a Lambertian distribution. Moreover, the current confinement structure LED has a light emission diameter of 80 μm, a central wavelength of 650 nm and a half-wavelength width of approximately 15 nm. As the light source 6, light sources having time coherence enabling generation of interference by an optical path length difference due to the gap G formed between the cover glass 9 and the reflective member 4, such as an LED other than the current confinement structure LED and a semiconductor laser can be used.

As illustrated in FIG. 2, a divergent light flux exiting from the light source 6 is transmitted through the sealing layer 8 and then enters the cover glass 9. A partial light flux (hereinafter referred to as "a first light flux") 21 of the entire light flux entering the cover glass 9 is internally reflected at a gap-side surface (interface between the cover glass 9 and the gap G) 9a of the cover glass 9 to be folded toward the light-receiving element arrays 7A to 7c. The folded first light flux 21 exits from the cover glass 9, is transmitted through the sealing layer 8 and then reaches the light-receiving element arrays 7A to 7c. On the other hand, another partial light flux (hereinafter referred to as "a second light flux") 22 of the entire light flux entering the cover glass 9 from the light source 6 is transmitted through the cover glass 9, passes through the gap G and is then reflected by the reflective surface 4a of the reflective member 4. The second light flux 22 reflected by the reflective surface 4a is again transmitted through the cover glass 9 and the sealing layer 8 and reaches the light-receiving element arrays 7A to 7C.

On the light-receiving element arrays 7A to 7C, the first and second light fluxes 21 and 22 interfere with each other to form interference fringes having a concentric stripe-like light quantity distribution. The light-receiving element arrays 7A to 7C each output an electrical signal (first signal) corresponding to the light quantity distribution (intensity distribution) of the interference fringes.

The z-axis direction which is vertical to light-receiving surfaces (light-receiving planes) of the light-receiving element arrays 7A to 7C and rotation directions about the x- and y-axes are hereinafter collectively referred to as "nonparallel-to-light-receiving-surface directions". The signals respectively output from the light-receiving element arrays 7A to 7C respectively vary in response to a variation in the intensity distribution of the interference fringes caused by the displacements of the displaceable member 2 in the nonparallel-to-light-receiving-surface directions including the vertical displacement in the z-axis direction and the rotational displacements about the x- and y-axes. Thus, using the output signals from the light-receiving element arrays 7A to 7C enables detecting the displacements of the displaceable member 2 in the nonparallel-to-light-receiving-surface directions.

Figure 4:
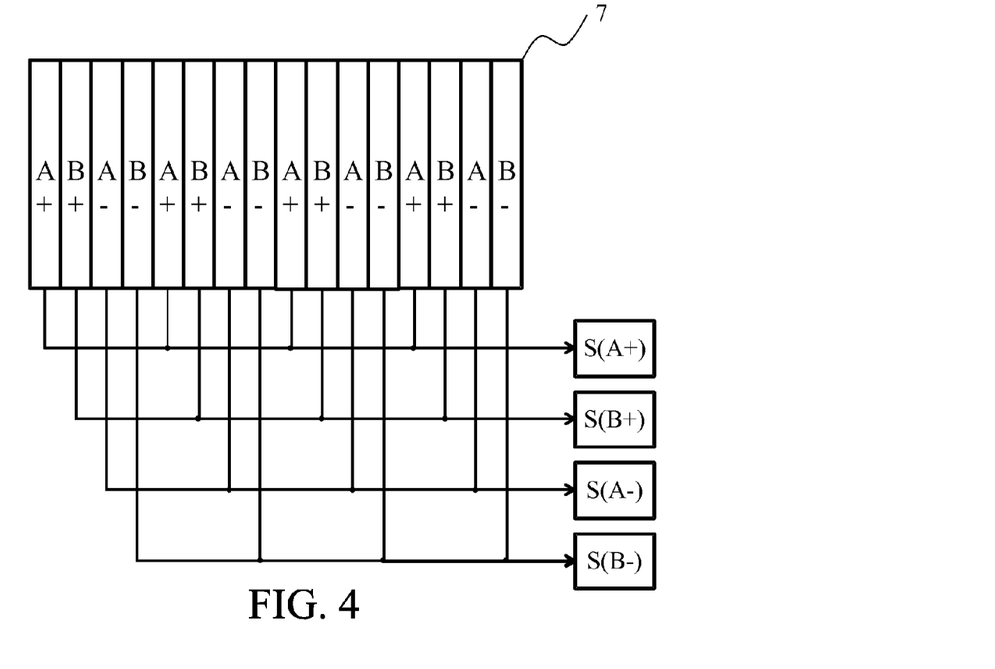
FIG. 4 illustrates a light-receiving element array in the sensor unit of Embodiment 1.

FIG. 4 illustrates arrangement of light-receiving elements of one of the three light-receiving element arrays 7A, 7B and 7C. The light-receiving element array is constituted by sixteen light-receiving elements arranged at equal pitches. The sixteen light-receiving elements include four light-receiving element groups respectively corresponding to four phases A+, B+, A– and B– and each including four light-receiving elements; the light-receiving elements of the four phases A+, B+, A– and B– are cyclically arranged in this order in a line. The width of a set of the four light-receiving elements of the four phases A+, B+, A– and B– is equal to or close to one period of the above-described interference fringes. All outputs of the four light-receiving elements of each group are added together. The signals added together respectively in the four phases are output to the signal processor 102 as four-phase analog electrical signals S(A+), S(B+), S(A–) and S(B–).

The signal processor 102 performs differential calculations of:

$$S(A)=S(A+)-S(A-); \text{ and}$$

$$S(B)=S(B+)-S(B-)$$

to produce two-phase signals S(A) and S(B) in which a common mode noise and a direct-current component are removed.

Furthermore, the signal processor 102 calculates a phase signal Φ from the two-phase signals S(A) and S(B) by using the following expression:

$$\Phi = A \text{ TAN } 2[S(A), S(B)]$$

where A TAN 2[Y,X] represents an inverse tangent function that determines an quadrant of coordinates (Y,X) and converts it into a phase from 0 to 2π.

The phase signal Φ calculated in this manner, which corresponds to a displacement of the interference fringes, varies by one period in response to a wavelength-order displacement of the displaceable member 2 provided with the reflective surface 4a. Detection of a displacement amount of the displaceable member 2 corresponding to more than one period (even multiple periods) of the phase signal Φ can be made by cumulating variation amounts of the phase signal Φ with consideration of folding thereof between 2π and 0.

In addition, this embodiment utilizes the interference between the two light fluxes, namely, the first and second light fluxes 21 and 22, which results in an extremely high sensitivity to the displacement and in output of the phase signal Φ close to an ideal sinusoidal wave, thereby enabling providing a high linearity of the variation of the phase signal Φ with respect to the displacement.

When ΦA, ΦB and ΦC respectively represent the phase signals Φ acquired from the light-receiving element arrays 7A, 7B and 7C, the signal processor 102 performs a matrix calculation expressed by following expression (1) to acquire displacement amounts of the displaceable member 2 (reflective surface 4a) in the nonparallel-to-light-receiving-surface directions, that is, a displacement amount Z in the z-axis direction, a rotation amount θx about the x-axis and a rotation amount θy about the y-axis.

$$\begin{bmatrix} Z \\ \theta x \\ \theta y \end{bmatrix} = \begin{bmatrix} 1/3 & 1/3 & 1/3 \\ 0 & -1/\sqrt{3} & 1/\sqrt{3} \\ 2/3 & -1/3 & -1/3 \end{bmatrix} \begin{bmatrix} \phi A \\ \phi B \\ \phi C \end{bmatrix} \quad (1)$$

A force Fz in the z-axis direction, a moment Mx about the x-axis and a moment My about the y-axis, which are external forces acting on the displaceable member 2 in three nonparallel-to-light-receiving-surface axes, respectively have approximately proportional relations with the displacement amount Z in the z-axis direction, the rotation amount θx about the x-axis and the rotation amount θy about the y-axis. Thus, the signal processor 102 converts the displacement amount Z, the rotation amount θx and the rotation amount θy, by respectively multiplying them by predetermined coefficients, into values of the external forces in the three nonparallel-to-light-receiving-surface axes to acquire the values.

As described above, this embodiment can realize a compact and thin optical force sensor capable of highly sensitively detecting the external forces (displacements) without reducing a stiffness of the sensor.

Although this embodiment described the case where the base member 1 is provided with the detector body (including the light source 6, the light-receiving element arrays 7A to 7C and the cover glass 9) of the displacement detector 5 and the displaceable member 2 is provided with the reflective member 4, an alternative configuration may be employed in which the base member 1 is provided with the reflective member and the displaceable member 2 is provided with the detector body. That is, the detector body may be provided to one of the base member 1 and the displaceable member 2, and the reflective member 4 may be provided to the other of them. This applies also to other embodiments described later.

Embodiment 2

Figure 5:
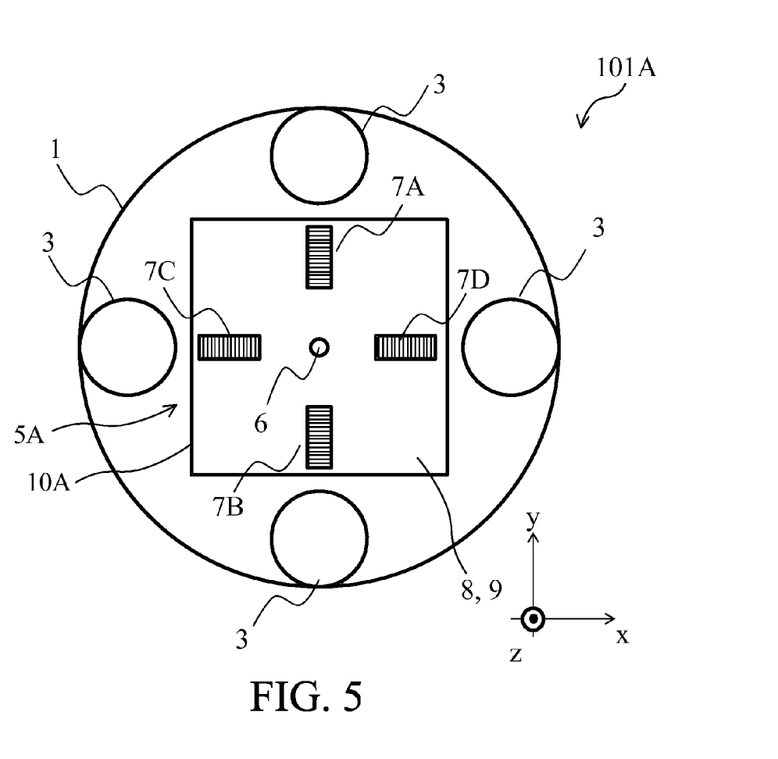
FIG. 5 is an x-y sectional view of a sensor unit of an optical force sensor that is Embodiment 2 of the present invention.

FIG. 5 illustrates a configuration (z-axis cross-section similar to FIG. 3) of a sensor unit 101A of an optical force sensor that is a second embodiment (Embodiment 2) of the present invention. This embodiment includes four elastic supporting members 3 whose number and arrangement are different from those in Embodiment 1 and four light-receiving element arrays 7A to 7C whose number and arrangement are different from those in Embodiment 1. In this embodiment, constituent elements identical to those in Embodiment 1 are denoted by the same reference numerals as those in Embodiment 1.

In this embodiment, the four elastic supporting members 3 are provided to the sensor unit 101A, and the four light-receiving element arrays 7A, 7B, 7C and 7D are provided to a displacement detector 5A. The four elastic supporting members 3 are arranged between the base member 1 and the displaceable member 2 at four 90-degree angularly-spaced positions surrounding the displacement detector 5A that includes a circuit substrate 10A. In addition, at four 90-degree angularly-spaced positions on the circuit substrate 10A surrounding the light source 6, the four light-receiving element arrays 7A, 7B, 7C and 7D are respectively mounted so as to radially extend.

Each of the light-receiving element arrays 7A, 7B, 7C and 7D includes light-receiving elements with the same arrangement as that in Embodiment 1, and the light-receiving elements output the same four-phase analog electrical signals S(A+), S(B+), S(A−) and S(B−) as those in Embodiment 1. The signal processor 102 (not illustrated in FIG. 5) calculates, from the four-phase analog electrical signals, the same two-phase signals S(A) and S(B) and the same phase signal Φ as those in Embodiment 1.

When ΦA, ΦB, ΦC and ΦD respectively represent the phase signals Φ acquired from the light-receiving element arrays 7A, 7B, 7C and 7D, the signal processor 102 performs a matrix calculation expressed by following expression (2) to acquire displacement amounts of the displaceable member 2 (reflective surface 4a) in the nonparallel-to-light-receiving-surface directions, that is, a displacement amount Z in the z-axis direction, a rotation amount θx about the x-axis and a rotation amount θy about the y-axis.

$$\begin{bmatrix} Z \\ \theta x \\ \theta z \end{bmatrix} = \begin{bmatrix} 1/4 & 1/4 & 1/4 & 1/4 \\ 1/2 & -1/2 & 0 & 0 \\ 0 & 0 & 1/2 & -1/2 \end{bmatrix} \begin{bmatrix} \phi A \\ \phi B \\ \phi C \\ \phi D \end{bmatrix} \quad (2)$$

Then, the signal processor 102 converts, as in Embodiment 1, the displacement amount Z, the rotation amount θx and the rotation amount θy, by respectively multiplying them by predetermined coefficients, into values of external forces in the three nonparallel-to-light-receiving-surface axes.

This embodiment also can realize a compact and thin optical force sensor capable of highly sensitively detecting the external forces (displacements) without reducing a stiffness of the sensor. Moreover, this embodiment detects the moments about the two axes with the mutually different light-receiving elements, which enables providing a good signal separation characteristic.

Embodiment 3

Figure 6:
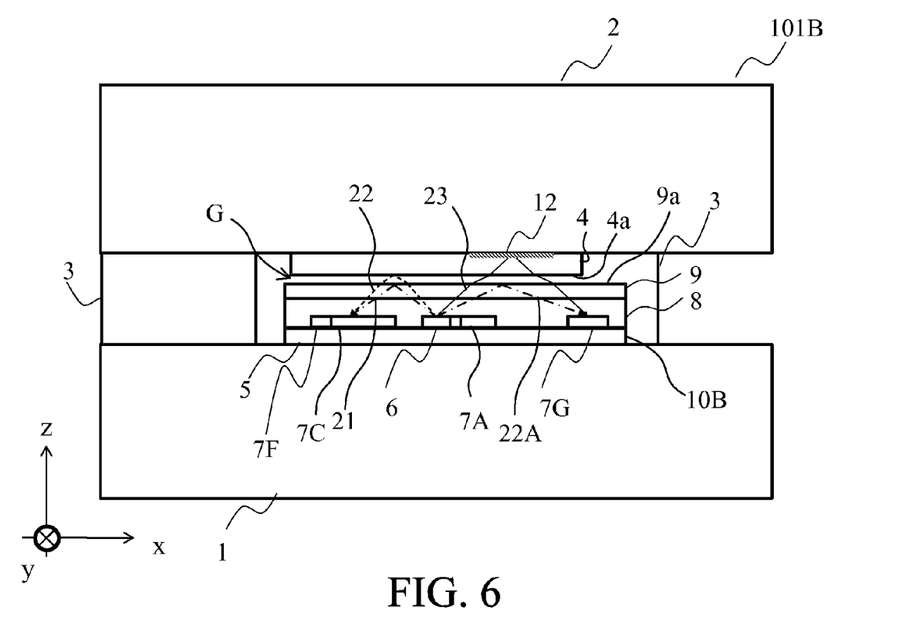
FIG. 6 is a side sectional view of a sensor unit in an optical force sensor that is Embodiment 3 of the present invention.
Figure 7:
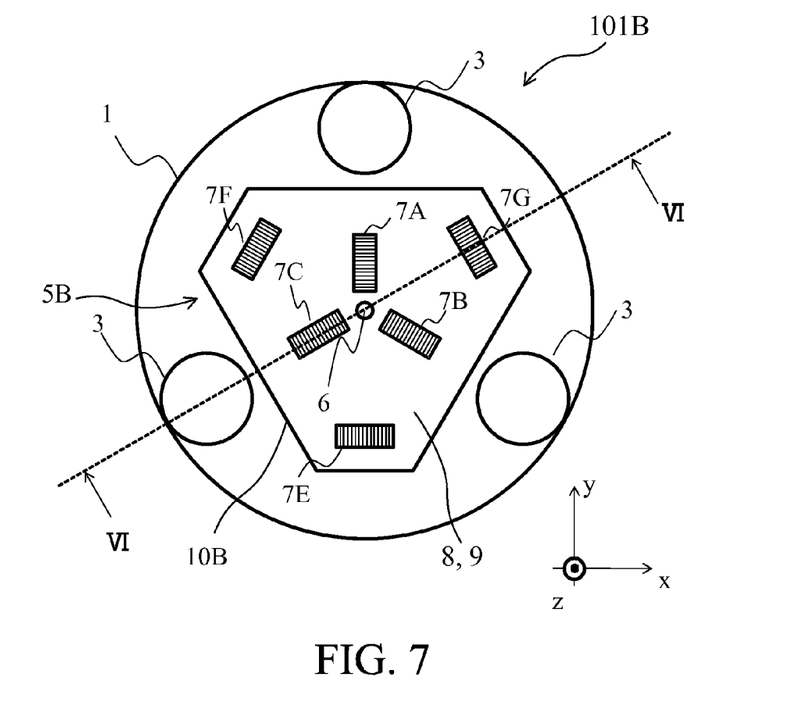
FIG. 7 is an x-y sectional view of the sensor unit of Embodiment 3.

FIG. 6 illustrates a configuration (side section) of a sensor unit 101B of an optical force sensor that is a third embodiment (Embodiment 3) of the present invention. FIG. 7 illustrates a z-axis cross-section of the sensor unit 101B. FIG. 6 illustrates a section of the sensor unit 101B cut along a VI-VI line in FIG. 7.

The sensor of this embodiment is capable of detecting six-axis external forces including the three-axis external forces that can be detected in Embodiment 1 and other three-axis external forces acting in in-surface directions of light-receiving surfaces of light-receiving-element arrays (hereinafter referred to as "in-light-receiving-surface directions") corresponding to a second direction along the x- and y-axes. In this embodiment, constituent elements identical to those of Embodiment 1 are denoted by the same reference numerals as those in Embodiment 1.

In this embodiment, a displacement detector 5B of the sensor unit 101B is constituted by a detector body, a reflective member 4 and a reflective diffraction grating 12. FIG. 7 illustrates the configuration of the sensor unit 101B in which the displaceable member 2 and the reflective member 4 are omitted and the base member 1, the elastic supporting members 3 and the detector body of the displacement detector 5B are viewed from the z-axis direction (vertical direction).

The detector body is constituted by the light source 6, the three light-receiving element arrays (first light-receiving element) 7A, 7B and 7C, three light-receiving element arrays (second light-receiving element) 7E, 7F and 7G, the sealing layer (light-transmissive plastic) 8, the cover glass (light-transmissive member) 9 and a circuit substrate 10B. The circuit substrate 10B has a hexagonal shape (or a circular shaped) and is fixed to a central portion of a circular-shaped upper surface (plane) of the base member 1. The three elastic supporting members 3 are arranged at three 120-degree angularly-spaced positions surrounding the displacement detector 5B that includes the circuit substrate 10B. At a center of the circuit substrate 10B, the light source 6 is mounted. Of the circuit substrate 10B, at three 120-degree angularly-spaced positions in an inner circumferential area surrounding the light source 6, the three light-receiving element arrays 7A, 7B and 7C are respectively mounted so as to radially extend.

Furthermore, of the circuit substrate 10B, at three 120-degree angularly-spaced positions in an outer circumferential area (area located farther than the light receiving element arrays 7A, 7B and 7C from the light source 6), three light-receiving element arrays 7E, 7F and 7G are respectively mounted so as to extend in tangential directions to a circumferential direction of the outer circumferential area. The three positions at which the light-receiving element arrays 7E to 7G are respectively arranged are shifted in the circumferential direction by 60 degrees with respect to the three positions at which the light-receiving element arrays 7A, 7B and 7C are respectively arranged. The light source 6 and the light-receiving element arrays 7A to 7G are covered by the sealing layer 8 formed so as to cover an upper surface of the circuit substrate 10B. Furthermore, on the upper surface of the sealing layer 8, the cover glass 9 is disposed. As in Embodiment 1, above the cover glass 9, the reflective member 4 is fixed to the lower surface of the displaceable member 2. Between the upper surface (gap-side surface) 9a of the cover glass 9 and the reflective surface 4a that is the lower surface of the reflective member 4, the gap (air layer) G having a height of approximately 20 µm is formed. In this embodiment, on an upper surface (back surface opposite to the reflective surface 4a) of the reflective member 4, the reflective diffraction grating 12 is provided. As described above, the light source 6 and the light-receiving element arrays 7A to 7G mounted on the circuit substrate 10B (i.e., on a same substrate and on an x-y plane as a same plane) fixed to the base member 1 are arranged so as to face the reflective member 4 and the reflective diffraction grating 12 which are displaceable together with the displaceable member 2 across the cover glass 9 and the gap G. As illustrated in FIG. 6, a divergent light flux exiting from the light source 6, which is constituted by a current confinement structure LED or the like as in Embodiment 1, is transmitted through the sealing layer 8 and then enters the cover glass 9. Of the entire light flux entering the cover glass 9, a first light flux 21 is internally reflected at a gap-side surface 9a of the cover glass 9 to be folded toward the light-receiving element arrays 7A to 7C. The folded first light flux 21 exits from the cover glass 9, is transmitted through the sealing layer 8 and then reaches the light-receiving element arrays 7A to 7c.

On the other hand, a second light flux 22 of the entire light flux entering the cover glass 9 from the light source 6 is transmitted through the cover glass 9, passes through the gap G and is then reflected by the reflective surface 4a of the reflective member 4. Thereafter, the second light flux 22 reflected by the reflective surface 4a is again transmitted through the cover glass 9 and the sealing layer 8 and reaches the light-receiving element arrays 7A to 7C.

As described also in Embodiment 1, on the light-receiving element arrays 7A to 7C, the first and second light fluxes 21 and 22 interfere with each other to form interference fringes. The light-receiving element arrays 7A to 7C each output an electrical signal corresponding to a light quantity distribution (intensity distribution) of the interference fringes. Therefore, using the output signals from the light-receiving element arrays 7A to 7C varying in response to a variation in the intensity distribution of the interference fringes caused by the displacements of the displaceable member 2 in the nonparallel-to-light-receiving-surface directions enables detecting the displacements of the displaceable member 2 in the nonparallel-to-light-receiving-surface directions. Furthermore, a light flux (hereinafter referred to as "a third light flux") 23 entering the cover glass 9 from the light source 6, being transmitted therethrough and then being transmitted through the reflective surface 4a of the reflective member 4 is reflected by the reflective diffraction grating 12 formed on the back surface of the reflective member 4. The third light flux 23 reflected by the reflective diffraction grating 12 exits from the reflective surface 4a of the reflective member 4, is again transmitted through the cover glass 9 and the sealing layer 8 and then reaches the light-receiving element arrays 7E to 7G.

The third light flux 23 forms, on the light-receiving element arrays 7E to 7G, a grating image that is an optical image having a double size of the reflective diffraction grating 12. The light-receiving element arrays 7E to 7G each output an electrical signal corresponding to a light quantity distribution (intensity distribution) of the grating image.

The signals respectively output from the light-receiving element arrays 7E to 7G vary in response to a variation in the intensity distribution of the grating image caused by the displacements of the displaceable member 2 in the in-lightreceiving-surface directions including parallel displacements in the x- and y-axis directions and a rotational displacement about the z-axis. Thus, using the output signals from the light-receiving element arrays 7E to 7G enables detecting the displacements of the displaceable member 2 in the in-light-receiving-surface directions. As illustrated in FIG. 6, the light-receiving element arrays 7E to 7G are arranged at positions where the second light flux (fourth light flux) 22A hits the gap-side surface 9a of the cover glass 9 at an incident angle larger than a critical angle and is thereby internally reflected at the gap-side surface 9a to reach the light-receiving element arrays 7E to 7G. The critical angle is a smallest incident angle of light to a surface at which the light is totally reflected by the surface. Therefore, the first light flux 21 does not reach the light-receiving element arrays 7E to 7G, and consequently the first and second light fluxes 21 and 22A do not form interference fringes thereon. Each of the light-receiving element arrays 7A to 7C and 7E to 7G includes light-receiving elements with the same arrangement as that in Embodiment 1, and the light-receiving elements output the same four-phase analog electrical signals S(A+), S(B+), S(A−) and S(B−) as those in Embodiment 1. The signal processor 102 (not illustrated in FIGS. 6 and 7) calculates, from the four-phase analog electrical signals, the same two-phase signals S(A) and S(B) and the same phase signal Φ as those in Embodiment 1. The signal processor 102 in this embodiment corresponds to a first calculator and a second calculator. In addition, as the reflective diffraction grating 12, a waveform-distortion reduction pattern is desirable to be used in order to increase linearity of the variation of the phase signal with respect to the displacement of the displaceable member 2.

When ΦA, ΦB and ΦC respectively represent the phase signals Φ acquired from the light-receiving element arrays 7A, 7B and 7C, and ΦE, ΦF and ΦG respectively represent the phase signals Φ acquired from the light-receiving element arrays 7E, 7F and 7G, the signal processor 102 performs a matrix calculation expressed by following expression (3) to acquire displacement amounts of the displaceable member 2 (reflective surface 4a) in the nonparallel-to-light-receiving-surface directions, that is, a displacement amount Z in the z-axis direction, a rotation amount θx about the x-axis and a rotation amount θy about the y-axis, and to acquire displacement amounts of the displaceable member 2 (reflective diffraction grating 12) in the in-light-receiving-surface directions, that is, a displacement amount X in the x-axis direction, a displacement amount Y in the y-axis direction and a rotation amount Oz about the z-axis.

$$\begin{bmatrix} \theta x \\ \theta y \\ \theta z \\ X \\ Y \\ Z \end{bmatrix} = \begin{bmatrix} 0 & 0 & 0 & 0 & -1/\sqrt{3} & 1/\sqrt{3} \\ 0 & 0 & 0 & -2/3 & 1/3 & 1/3 \\ 1/3 & 1/3 & 1/3 & 0 & 0 & 0 \\ 0 & 1/\sqrt{3} & -1/\sqrt{3} & 0 & -1/\sqrt{3}\,\alpha & 1/\sqrt{3}\,\alpha \\ 2/3 & -1/3 & -1/3 & -2/3\beta & 1/3\beta & 1/3\beta \\ 0 & 0 & 0 & 1/3 & 1/3 & 1/3 \end{bmatrix} \begin{bmatrix} \phi A \\ \phi B \\ \phi C \\ \phi E \\ \phi F \\ \phi G \end{bmatrix} \quad (3)$$

In expression (3), α and β respectively represent coefficients equivalent to half of sensitivities to the displacements of the grating image on the light-receiving element arrays 7E to 7G in the x- and y-axis directions when the reflective member 4 is rotationally displaced by the rotation amounts θx and θy. The reason for using the coefficient equivalent to half of the sensitivity is that the displacement of the grating image is doubled compared to the displacement of the reflective member 4 in the in-light-receiving-surface direction. Using the coefficients α and β enables converting the displacement of the grating image on the light-receiving element arrays 7E to 7G into the displacement of the reflective member 4 in the in-light-receiving-surface direction.

The coefficients α and β depend on design of the sensor unit 101B, and can be acquired by geometrical-optical calculation using design values such as a distance between the light source 6 and the reflective diffraction grating 12 and a distance between the light source 6 and the light-receiving element arrays 7E to 7G. The coefficients may be set alternatively by actual measurement. In this manner, in the displacement detection in the in-light-receiving-surface direction using the reflective diffraction grating 12, a crosstalk component generated due to a tilt displacement of the reflective member 4 can be removed. As described also in Embodiment 1, the force Fz in the z-axis direction, the moment Mx about the x-axis and the moment My about the y-axis, which are external forces acting on the displaceable member 2 in three nonparallel-to-light-receiving-surface axes, respectively have approximately proportional relations with the displacement amount Z in the z-axis direction, the rotation amount θx about the x-axis and the rotation amount θy about the y-axis. Thus, the signal processor 102 converts the displacement amount Z, the rotation amount θx and the rotation amount θy, by respectively multiplying them by predetermined coefficients, into values of the external forces in the three nonparallel-to-light-receiving-surface axes to acquire the values.

Similarly, a force Fx in the x-axis direction, a force Fy in the y-axis direction and a moment Mz about the z-axis, which are external forces acting on the displaceable member 2 in three in-light-receiving-surface axes, respectively have approximately proportional relations with the displacement amount X in the x-axis direction, the displacement amount Y in the y-axis direction and the rotation amount θz about the z-axis. Thus, the signal processor 102 converts the displacement amount X, the displacement amount Y and the rotation amount θz, by respectively multiplying them by predetermined coefficients, into values of the external forces in the three in-light-receiving-surface axes to acquire the values.

As described above, this embodiment also can realize a compact and thin optical force sensor capable of highly sensitively detecting the external forces (displacements) without reducing a stiffness of the sensor. Moreover, this embodiment can realize a six-axis force sensor capable of detecting not only the external forces in the three nonparallel-to-light-receiving-surface axes but also the external forces in the three in-light-receiving-surface axes.

In this embodiment, the concentric stripe-like interference fringes formed by the interference between the first and second light fluxes 21 and 22 is different in direction by 90 degrees from diffraction interference fringes formed by interference between the third light flux 23 reflected by the reflective diffraction grating 12 and second light fluxes 23 and 22A. Therefore, even when the light-receiving element arrays 7A to 7C and 7E to 7G are arranged at positions where these interference fringes overlap each other, the signals output therefrom are not significantly affected thereby. Accordingly, the light-receiving element arrays 7A to 7C and the light-receiving element arrays 7E to 7G may be arranged on a same circle centered at the light source 6.

Embodiment 4

Figure 8:
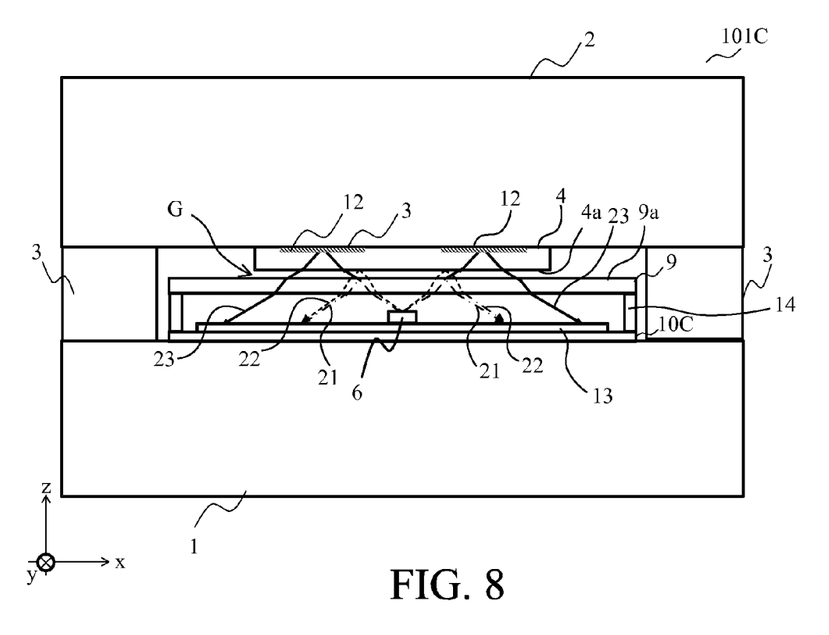
FIG. 8 is a side sectional view of the sensor unit of Embodiment 3.
Figure 9:
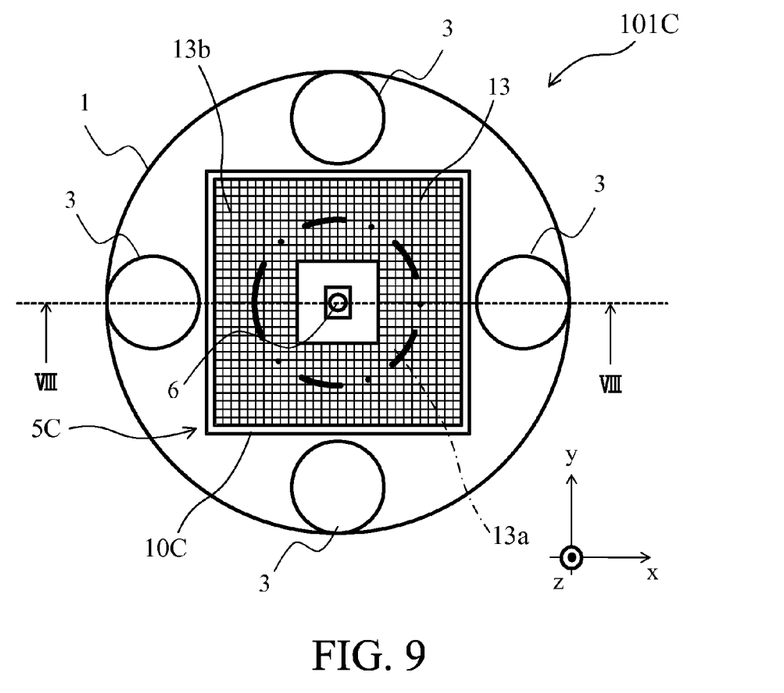
FIG. 9 is an x-y sectional view of a sensor unit in an optical force sensor that is Embodiment 4 of the present invention.

FIG. 8 illustrates a configuration (side section) of a sensor unit 101C of an optical force sensor that is a fourth embodiment (Embodiment 4) of the present invention. FIG. 9 illustrates a z-axis cross-section of the sensor unit 101C. FIG. 8 illustrates a section of the sensor unit 101C cot along a VIII-VIII line in FIG. 9. In this embodiment, constituent elements identical to those of Embodiment 2 are denoted by the same reference numerals as those in Embodiment 1.

In this embodiment, a displacement detector 5C of the sensor unit 101C is constituted by a detector body, the reflective member 4 and multiple reflective diffraction gratings 12. FIG. 9 illustrate a configuration of the sensor unit 101C in which the displaceable member 2, the reflective member 4 and the cover glass 9 of the displacement detector 5C are omitted, and the base member 1, four elastic supporting members 3 and the detector body of the displacement detector 5C are viewed from the z-axis direction (vertical direction).

The detector body of the displacement detector 5C is constituted by the light source 6, a two-dimensional area sensor 13 as a two-dimensional image sensor as a CCD sensor, the cover glass (light-transmissive member) 9 and a circuit substrate 10C. The circuit substrate 10C has a rectangular shape (or a circular shape) and is fixed to the central portion of the circular-shaped upper surface (plane) of the base member 1. The four elastic supporting members 3 are arranged at four 90-degree angularly-spaced positions surrounding the displacement detector 5C including the circuit substrate 10C.

The area sensor 13 is mounted on the circuit substrate 10C. In a rectangular area formed at a center of the area sensor 13, pixels of the area sensor 13 are not arranged. In the rectangular area, electrodes for the light source (not illustrated in FIG. 9) are formed, and the light source 6 is mounted therein.

In an outer peripheral area outside the area sensor 13 on the circuit substrate 10C, a spacer 14 having a rectangular frame shape is disposed. On an upper end of the spacer 14, the cover glass 9 is disposed. The area sensor 13 and the light source 6 on the circuit substrate 10C are thus packaged with a space surrounded by the spacer 14 and the cover glass 9. Above the cover glass 9, the reflective member 4 is fixed to the lower surface of the displaceable member 2. Between the upper surface (gap-side surface) 9a of the cover glass 9 and the reflective surface 4a that is the lower surface of the reflective member 4, a gap (air layer) G having a height of approximately 20 μm is formed. Furthermore, on the upper surface (back surface opposite to the reflective surface 4a) of the reflective member 4, the multiple reflective diffraction gratings 12 are provided.

As described above, the light source 6 and the area sensor 13 mounted on the circuit substrate 10B (i.e., on a same substrate) fixed to the base member 1 are arranged so as to face the reflective member 4 and the reflective diffraction gratings 12 displaceable together with the displaceable member 2 across the cover glass 9 and the gap G.

As illustrated in FIG. 8, a divergent light flux exiting from the light source 6 constituted by, as in Embodiment 1, a current-confinement structure LED or the like passes through a space (hereinafter referred to as "a package space") on the light source 6 and the area sensor 13 and enters the cover glass 9. Of the entire light flux entering the cover glass 9, a first light flux 21 is internally reflected at the gap-side surface 9a of the cover glass 9 to be folded toward the area sensor 13. The folded first light flux exits from the cover glass 9, passes through the package space and then, as illustrated in FIG. 9, enters a first light-receiving area 13a corresponding to a first light-receiving element of the area sensor 13.

On the other hand, a second light flux 22 of the entire light flux entering the cover glass 9 from the light source 6 is transmitted through the cover glass 9, passes through the gap G and is then reflected by the reflective surface 4a of the reflective member 4. The second light flux 22 reflected by the reflective surface 4a is again transmitted through the cover glass 9, passes through the package space and then reaches the first light-receiving area 13a.

Similarly to Embodiments 1 and 3, on the first light-receiving area 13a, the first and second light fluxes 21 and 22 interfere with each other to form interference fringes. The area sensor 13 outputs, from the first light-receiving area 13a, an image signal corresponding to a light quantity distribution (intensity distribution) of the interference fringes. Using the output signal from the first light-receiving area 13a that varies in response to a variation in the intensity distribution of the interference fringes caused by the displacement of the displaceable member 2 in the nonparallel-to-light-receiving-surface direction enables detecting the displacement of the displaceable member 2 in the nonparallel-to-light-receiving-surface direction.

On the other hand, a third light flux 23 entering the cover glass 9 from the light source 6, being transmitted therethrough and then being transmitted through the reflective surface 4a of the reflective member 4 is reflected by the reflective diffraction gratings 12 formed on the back surface of the reflective member 4. As illustrated in FIG. 9, the third light flux 23 reflected by the reflective diffraction gratings 12 exits from the reflective surface 4a of the reflective member 4, is again transmitted through the cover glass 9, again passes through the package space and then reaches a second light-receiving area 13b corresponding to a second light-receiving element of the area sensor 13. The third light flux 23 forms, on the second light-receiving area 13b, grating images that are optical images each having a double size of the corresponding one of the reflective diffraction gratings 12. The area sensor 13 outputs, from the second light-receiving area 13b, an image signal corresponding to a light quantity distribution (intensity distribution) of the grating images.

Similarly to Embodiment 3, the signal (image signal) output from the second light-receiving area 13b varies in response to a variation in the intensity distribution of the grating image caused by the displacements of the displaceable member 2 in the in-light-receiving-surface directions. Thus, using the image signal output from the second light-receiving area 13b enables detecting the displacements of the displaceable member 2 in the in-light-receiving-surface directions. The signal processor 102 (not illustrated in FIGS. 8 and 9) performs an image process on the image signal output from the area sensor 13 to produce signals respectively corresponding to the phase signals ΦA, ΦB, ΦC, ΦE, ΦF and ΦG described in Embodiment 3. In this process, the signal processor 102 may detect a pitch of the concentric stripe-like interference fringes by using the image signal from the first light-receiving area 13a and correct, by using the detection result, phase amounts (calculation results acquired from the output from the second light-receiving area 13b) of the phase signals ΦE to ΦG. This correction enables accurately converting the phase signals ΦE to ΦG into external forces even when the pitch of the interferential fringes varies due to a rotation or the like of the displaceable member 2 in the nonparallel-to-light-receiving-surface direction. Since the subsequent calculations are same as those in Embodiment 3, description thereof is omitted.

This embodiment also can realize a compact and thin optical force sensor capable of highly sensitively detecting the external forces (displacements) without reducing a stiffness of the sensor.

Embodiment 5

Figure 10:
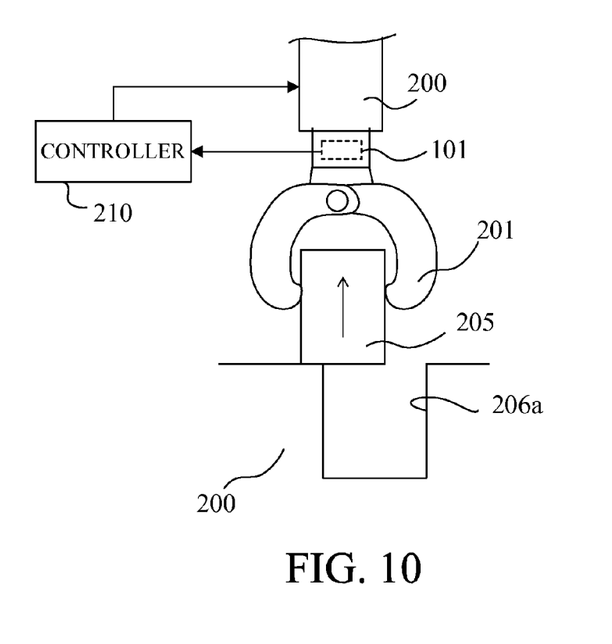
FIG. 10 illustrates a configuration of a robot arm that is Embodiment 5 of the present invention.

FIG. 10 illustrates a configuration of a carrying apparatus with a robot arm as an apparatus using any one of the optical force sensors described in Embodiments 1 to 4.

A robot arm 200 as a movable portion configured to perform an operation grasps, by its grasping portion 201, an object 205 to be carried. The robot arm 200 performs the operation to insert the object 205 into a hole portion 206a formed on a substrate 206. This operation is controlled by a controller 210.

The robot arm 200 is provided with the optical force sensor (FIG. 10 shows the sensor unit 101 of the optical sensor of Embodiment 1) to detect an upward external force acting on the grasping portion 201 from the substrate 206 via the object 205.

When the object 205 is in contact with a portion of an upper surface of the substrate 206 other than the hole portion 206a, the external force acts on the force sensor (sensor unit 101) from the grasping portion 201. Therefore, the force sensor detects that the object 205 is located at a position where the hole portion 206a is not formed. In response to this detection, the controller 210 controls the operation of the robot arm 200 so as to move the object 205 along the upper surface of the substrate 206.

When the object 205 is located at a position below which the hole portion 206a is formed, the external force acting on the force sensor (sensor unit 101) from the holding portion 201 extinguishes, and therefore the force sensor detects that the object 205 is located at a position coinciding with that of the hole portion 206a. In response to this detection, the controller 210 controls the operation of the robot arm 200 so as to insert the object 205 into the hole portion 206a.

Using any one of the optical force sensors described in Embodiments 1 to 4 for the robot arm 200 enables controlling the operation of the robot arm 200 with good accuracy.

Each of the optical force sensors described in Embodiments 1 to 4 can be used for not only such a carrying apparatus with the robot arm, but also various apparatuses that control an operation of a movable portion by using an external force detection result.

As described above, each of the embodiments can realize a compact and thin optical force sensor capable of detecting the displacement in the first direction that is a nonparallel-to-surface direction with respect to the light-receiving surface of the light-receiving element, with high sensitivity (that is, with high accuracy), without reducing a stiffness of the sensor. Accordingly, using the force sensor enables realizing an apparatus capable of controlling an operation of a movable portion with high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-075058, filed on Apr. 1, 2014, which is hereby incorporated by reference herein in its entirety.

What is claimed is:

1. An optical force sensor comprising:
   a base member;
   a displaceable member, the displaceable member and the base member being mutually separated in a first direction;
   an elastic member disposed between the base member and the displaceable member; and
   a displacement detector configured to optically detect a displacement of the displaceable member with respect to the base member, the displacement being caused by an external force,
   wherein the displacement detector includes:
   a light source provided to one member of the base member and the displaceable member;
   a reflective surface provided to another member of the base member and the displaceable member;
   a light-transmissive member disposed between the light source and the reflective surface and having a gap with the reflective surface; and
   a first light-receiving element provided to the one member, and
   wherein the displacement detector is configured:
   (a) to cause a first light flux and a second light flux to form interference fringes on the first light-receiving element, the first light flux exiting from the light source and being internally reflected at a gap-side surface of the light-transmissive member, the second light flux exiting from the light source, being transmitted through the light-transmissive member, being reflected by the reflective surface and being again transmitted through the light-transmissive member; and
   (b) to output an output signal based on a variation of a first signal output from the first light-receiving element configured to detect an intensity distribution of the interference fringes, the variation being caused by a displacement of the displaceable member in the first direction.

2. An optical force sensor according to claim 1, further comprising a first calculator configured to calculate an external force acting in the first direction by using the output from the first light-receiving element.

3. An optical force sensor according to claim 1,
   wherein the displacement detector includes:
   a diffraction grating provided to the one member; and
   a second light-receiving element provided to the other member, and
   wherein the displacement detector is configured:
   (a) to cause a third light flux to form an optical image on the second light-receiving element, the third light flux exiting from the light source, being transmitted through the light-transmissive member, being reflected by the diffraction grating and being again transmitted through the light-transmissive member; and
   (b) to output, from the second light-receiving element, a signal corresponding to a displacement of the optical image, the displacement of the optical image being caused by a displacement of the displaceable member in a second direction orthogonal to the first direction and parallel to a light-receiving surface of the second light-receiving element.

4. An optical force sensor according to claim 3, wherein the second light-receiving element is disposed at a position where the second light flux hits the gap-side surface of the light-transmissive member at an incident angle larger than a critical angle, is internally reflected at the gap-side surface and then enters the second light-receiving element.

5. An optical force sensor according to claim 3, further comprising a second calculator configured to calculate an external force acting in the second direction by using the output from the second light-receiving element.

6. An optical force sensor according to claim 5, wherein the second calculator is configured to correct, by using the output from the first light-receiving element, its calculation result calculated using the output from the second light-receiving element.

7. An optical force sensor according to claim 1, wherein the light source is a current confinement structure LED.

8. An optical force sensor according to claim 1, wherein the light source and the first light-receiving element are mounted on a same substrate.

9. An optical force sensor according to claim 3, wherein the first and second light-receiving elements are included in a two-dimensional image sensor.

10. An apparatus comprising:
a movable portion configured to perform an operation;
an optical force sensor; and
a controller configured to control the operation of the movable portion by using the optical force sensor,
wherein:
the optical force sensor comprises:
a base member;
a displaceable member configured to move integrally with the movable portion, the displaceable member and the base member being mutually separated in a first direction;
an elastic member disposed between the base member and the displaceable member; and
a displacement detector configured to optically detect a displacement of the displaceable member with respect to the base member, the displacement being caused by an external force, and
the displacement detector includes:
a light source provided to one member of the base member and the displaceable member;
a reflective surface provided to another member of the base member and the displaceable member;
a light-transmissive member disposed between the light source and the reflective surface and having a gap with the reflective surface; and
a first light-receiving element provided to the one member, and
wherein the displacement detector is configured:
(a) to cause a first light flux and a second light flux to form interference fringes on the first light-receiving element, the first light flux exiting from the light source and being internally reflected at a gap-side surface of the light-transmissive member, the second light flux exiting from the light source, being transmitted through the light-transmissive member, being reflected by the reflective surface and being again transmitted through the light-transmissive member; and
(b) to output an output signal based on a variation of a first signal output from the first light-receiving element configured to detect an intensity distribution of the interference fringes, the variation being caused by a displacement of the displaceable member in the first direction.

* * * * *